US011407667B1

(12) United States Patent
Moylan

(10) Patent No.: US 11,407,667 B1
(45) Date of Patent: Aug. 9, 2022

(54) SYSTEMS AND METHODS FOR REMOVAL OF CARBON DIOXIDE FROM SEAWATER

(71) Applicant: Christopher R. Moylan, Lahaina, HI (US)

(72) Inventor: Christopher R. Moylan, Lahaina, HI (US)

(*) Notice: Subject to any disclaimer, the term of this patent is extended or adjusted under 35 U.S.C. 154(b) by 0 days.

(21) Appl. No.: 17/472,529

(22) Filed: Sep. 10, 2021

Related U.S. Application Data

(60) Provisional application No. 63/197,451, filed on Jun. 6, 2021.

(51) Int. Cl.
B01D 53/26 (2006.01)
B01D 69/02 (2006.01)
B01D 71/70 (2006.01)
C02F 1/00 (2006.01)
C02F 1/20 (2006.01)
C02F 103/08 (2006.01)
C02F 3/34 (2006.01)
B01D 19/00 (2006.01)
C02F 9/00 (2006.01)
C02F 101/10 (2006.01)

(52) U.S. Cl.
CPC ............ C02F 9/00 (2013.01); B01D 19/0031 (2013.01); B01D 53/265 (2013.01); B01D 69/02 (2013.01); B01D 71/70 (2013.01); B01D 2325/02 (2013.01); C02F 1/001 (2013.01); C02F 1/20 (2013.01); C02F 3/342 (2013.01); C02F 2101/10 (2013.01); C02F 2103/08 (2013.01)

(58) Field of Classification Search
CPC .... C02F 1/20; C02F 3/342; C02F 9/00; C02F 2103/08; B01D 71/70
See application file for complete search history.

(56) References Cited

U.S. PATENT DOCUMENTS

| 5,246,619 A | 9/1993 | Niswander |
| 6,846,951 B1 | 1/2005 | Theibaut |
| 7,309,342 B2 | 12/2007 | Genovesi et al. |
| 7,326,280 B2 | 2/2008 | Hryeak et al. |
| 7,329,307 B2 | 2/2008 | Hryeak et al. |
| 7,470,811 B2 | 12/2008 | Thiebaut |
| 7,527,670 B2 | 5/2009 | Ackley et al. |
| 7,942,891 B2 | 5/2011 | Genovesi et al. |
| 8,087,926 B2 | 1/2012 | Patrick et al. |
| 8,124,049 B2 | 2/2012 | Grover |

(Continued)

OTHER PUBLICATIONS

Khairkar, Shyam R., et al. "Hydrophobic interpenetrating polyamide-PDMS membranes for desalination, pesticides removal and enhanced chlorine tolerance." Chemosphere 258 (2020): 127179. (Year: 2020).*

(Continued)

Primary Examiner — Bradley R Spies
(74) Attorney, Agent, or Firm — Intellectual Property Law Group LLP

(57) ABSTRACT

The present invention generally relates to a system and methods for the separation and removal of carbon dioxide from seawater. The system includes an extraction system that collects carbon dioxide from the seawater through a medium, and removes carbon dioxide from the medium; the extraction system comprising a reactor and a membrane. Alternatively, the extraction system includes a reactor, a membrane and a catalyst.

15 Claims, 2 Drawing Sheets

(56) References Cited

U.S. PATENT DOCUMENTS

| | | |
|---|---|---|
| 8,163,070 B2 | 4/2012 | Hees et al. |
| 8,226,917 B2 | 7/2012 | Fan et al. |
| 8,404,027 B2 | 3/2013 | Koss et al. |
| 8,480,795 B2 | 7/2013 | Siskin et al. |
| 8,500,866 B2 | 8/2013 | Schmitt |
| 8,501,105 B2 | 8/2013 | Fan et al. |
| 8,759,047 B2 | 6/2014 | Datta et al. |
| 8,764,892 B2 | 7/2014 | Koss et al. |
| 8,940,261 B2 | 1/2015 | Liu et al. |
| 9,043,079 B2 | 5/2015 | Tsuchikiri et al. |
| 9,258,981 B2 | 2/2016 | Bragion |
| 9,353,022 B2 | 5/2016 | Lindell et al. |
| 9,381,463 B2 | 7/2016 | Elmer et al. |
| 9,469,234 B2 | 10/2016 | White et al. |
| 9,486,731 B2 | 11/2016 | Filippi |
| 9,647,286 B2 | 5/2017 | Jamal et al. |
| 9,696,798 B2 | 7/2017 | Kritt et al. |
| 9,718,746 B2 | 8/2017 | Das et al. |
| 9,815,025 B2 | 11/2017 | Reddy et al. |
| 9,956,498 B1 | 5/2018 | Tucker |
| 10,000,713 B2 | 6/2018 | Mak |
| 10,014,541 B2 | 7/2018 | Jamal et al. |
| 10,092,852 B2 | 10/2018 | Tucker |
| 10,150,926 B2 | 12/2018 | Mak |
| 10,183,910 B2 | 1/2019 | Ostuni et al. |
| 10,435,295 B2 | 10/2019 | Eddy et al. |
| 10,507,404 B2 | 12/2019 | Tucker |
| 10,507,424 B1 | 12/2019 | Muller-Hellwig et al. |
| 10,532,317 B2 | 1/2020 | Reddy et al. |
| 10,737,791 B2 | 8/2020 | Space et al. |
| 10,793,511 B2 | 10/2020 | Kate et al. |
| 10,888,816 B2 | 1/2021 | Abdollahi et al. |
| 10,954,124 B2 | 3/2021 | Filippi et al. |
| 10,954,187 B2 | 3/2021 | Skinner et al. |
| 2010/0028242 A1* | 2/2010 | Willauer ............... B01D 71/26 423/437.1 |
| 2012/0171752 A1* | 7/2012 | Chance ................ A01G 7/02 435/252.1 |
| 2013/0171720 A1* | 7/2013 | McKenna ............. B01D 53/00 435/262 |
| 2014/0234946 A1* | 8/2014 | Constantz ............ B01D 53/78 435/266 |
| 2018/0280869 A1* | 10/2018 | Constantz ............ B01D 53/62 |

OTHER PUBLICATIONS

O. Alviso et al., "Directed Evolution of an Ultrastable Carbonic Anhydrase for Highly Efficient Carbon Capture from Flue Gas," Proc. Natl. Acad. Sci. 2014, vol. 111, pp. 16436-16441.

National Research Council, "Climate Intervention: Carbon Dioxide Removal and Reliable Sequestration", National Academies Press, Washington (2015) pp. 1-154.

Uwe Brand et al., "Methane Hydrate: Killer Cause of Earth's Greatest Mass Extinction," Paleoworld, vol. 25, Issue 4, Dec. 2016, pp. 496-507.

Masson-Delmotte, V. et al., eds., Intergovernmental Panel on Climate Change, "Global Warming of 1.5° C. An IPCC Special Report on the impacts of global warming of 1.5° C. above pre-industrial levels and related global greenhouse gas emission pathways, in the context of strengthening the global response to the threat of climate change, sustainable development, and efforts to eradicate poverty" Oct. 2018, pp. 1-630.

K.E. Kunkel et al., "Impacts, Risks, and Adaptation in the United States: Fourth National Climate Assessment, vol. II: Report-in-Brief," U.S. Global Change Research Program, USGCRP, Washington, DC, Nov. 2018, pp. 1-196.

Craig A. Bettenhausen, "Carbon Capture's Steep Climb", (C&EN) Chemical & Engineering News, ACS, Jul. 19, 2021, pp. 29-35.

\* cited by examiner

SYSTEMS AND METHODS FOR REMOVAL OF CARBON DIOXIDE FROM SEAWATER

FIELD OF THE INVENTION

The present invention relates to systems and methods that can separate and remove carbon dioxide from seawater, and thus indirectly from the atmosphere.

BACKGROUND OF THE INVENTION

With the escalating efforts to reduce climate change risk, demands to reduce gaseous emissions, for example, carbon dioxide gas, are being sought after that are efficient, safe and low cost.

Since at least the beginning of the Industrial Revolution, the human race has obtained the majority of its increasing energy use by burning fossil fuels. Combustion generates carbon dioxide, a strong and stable greenhouse gas.

This greenhouse effect from carbon dioxide emissions has become detrimental and a major threat to humanity. Thus, methods and systems have been sought after not only to refrain from adding more greenhouse gases to the atmosphere, but also to remove and sequester carbon dioxide actively. Such aforementioned methods and systems are commonly referred to as carbon capture technology.

Recently, most of the countries in the world have agreed to attempt reduce the emission of greenhouse gases. A variety of approaches to reduce or eliminate carbon dioxide has been outlined both through Paris Accords and by the National Research Council, (Climate Intervention: Carbon Dioxide Removal and Reliable Sequestration). Nevertheless, the concentration of carbon dioxide in the atmosphere, which was below 300 parts per million (ppm) during the stable temperature oscillations of the last several million years, is now over 415 ppm and continuously rising.

One of the most effective methods to reduce carbon dioxide from gaseous emissions in the atmosphere is reforestation. But with countries like Brazil slashing and burning the rain forest, it would require a major change even to increase the net removal of carbon dioxide from the air by plants, and then decades for the trees to grow to full capacity.

Other methods include direct air capture. These methods typically include amine-based extraction systems, solvent pump systems, or solid-sorbent capture systems, however, these methods are challenging and can be quite costly. Recently, more efficient efforts to reduce or eliminate gaseous emissions comprising carbon dioxide have been sought after. "Iron fertilization" of the ocean to promote algae growth has also been proposed and seemed promising. Other methods typically are electrochemical (for example, driving a current through a solution to convert bicarbonate ions to neutral gas). Unfortunately, most of these methods typically utilize sophisticated equipment, and require energy which can be expensive and time consuming. Further, the aforementioned methods have not been successfully scaled up.

Thus, although the above-mentioned methods can remove some carbon dioxide from the air, they have not been demonstrated beyond the pilot plant level.

For the foregoing reasons, there exists a need to find a solution to remove carbon dioxide from the atmosphere that is more efficient, less expensive, and more scaleable than current methods.

These features, advantages and other embodiments of the present invention are further made apparent in the remainder of the present description, appended claims and drawings, to those of ordinary skill in the art.

SUMMARY

The present invention is directed to a system and methods to separate and remove carbon dioxide from seawater. According to an embodiment of the present invention, the system comprises a reactor and a membrane. In an alternative embodiment, the system further includes a catalyst.

The present invention preferably pumps dissolved carbon dioxide gas out of filtered seawater. Part of the reactor volume is enclosed by a membrane permeable to both water and carbon dioxide. Preferably, the membrane is more permeable to carbon dioxide than to most other species. The pore size must be at least 3.3 angstroms in order to pass carbon dioxide molecules (water molecules are slightly smaller and can also pass at this pore size) and must be less than the size of the catalyst (42 angstroms in the case of carbonic anhydrase).

According to a most preferred alternative embodiment of the present invention, the system further comprises a catalyst. More preferably, the catalytic enzyme is carbonic anhydrase.

In an embodiment of the present invention, a method for separating and removing carbon dioxide from seawater is provided; the method comprising the steps of: a) pumping seawater into a system comprising a reactor; and a membrane; b) filtering the seawater to remove solids resulting in filtered seawater; c) pumping the filtered seawater into the reactor; d) exposing the filtered seawater to a membrane; e) subjecting the filtered seawater to the catalyst; f) allowing the filtered seawater to flow back and forth across the membrane to establish equilibrium forming an air gap above the filtered seawater, the air gap comprising gases including carbon dioxide and water vapor; g) evacuating the air gap above the filtered seawater to remove the carbon dioxide and water vapor; h) separating the carbon dioxide and water vapor at a cooler; and i) sequestering the carbon dioxide and condensing the water vapor.

In an alternative embodiment of the present invention, the system can include a catalyst. The method can further include subjecting the filtered seawater to the catalyst after exposing the filtered seawater to a membrane and before the step of allowing the filtered seawater to flow back and forth across the membrane to establish equilibrium.

BRIEF DESCRIPTION OF THE DRAWINGS

In order to describe embodiments of the present invention more fully, reference is made to the accompanying drawings. These drawings are not to be considered limitations in the scope of the invention, but are merely illustrative.

Figure 1A:
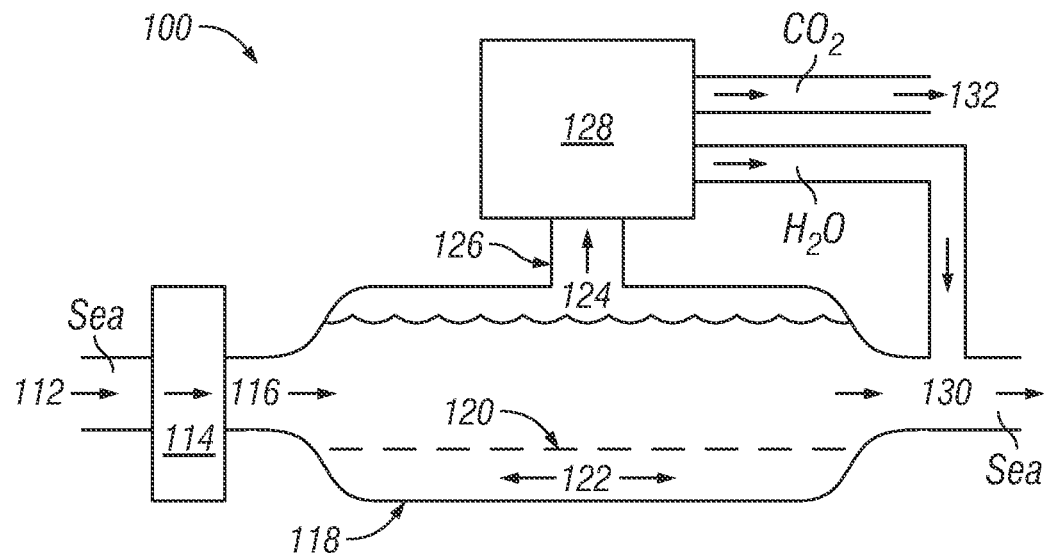
FIG. 1A illustrates a schematic system of separating and removing carbon dioxide from seawater; according to an embodiment of the present invention.

These and other features, aspects, and advantages of the present invention will become better understood with reference to the following description.

DETAILED DESCRIPTION OF EMBODIMENTS

The description and the drawings of the present disclosure focus on one or more preferred embodiments of the present invention, and describe exemplary optional features and/or alternative embodiments of the present invention. The description and drawings are for the purpose of illustration and not limitation. Those of ordinary skill in the art would recognize variations, modifications and alternatives which are also within the scope of the invention.

The present invention generally relates to a system and methods for separating, reduction and removal of carbon dioxide from seawater. The system includes an extraction system that collects carbon dioxide from the seawater through a medium, and removes carbon dioxide from the medium; the extraction system comprises a reactor, a membrane and a catalyst.

The present invention addresses the aforementioned need for the reduction of carbon dioxide in the atmosphere by conversion of bicarbonate ion in seawater into carbon dioxide ($CO_2$).

Preferably a catalytic enzyme is used. More preferably, the enzyme is catalyzed by enzyme carbonic anhydrase. According to an embodiment of the present invention, carbon dioxide is removed by partial evacuation.

In an embodiment of the present invention, a system and a method is provided to remove carbon dioxide from the ocean. According to a preferred embodiment, the system and methods reply on a natural equilibrium between dissolved and atmospheric carbon dioxide, which constantly strive to be reestablished, pulling carbon dioxide out of the air and dissolving it in the ocean.

Given the density of air, (1.2 g/L), and the molecular weight of $CO_2$, (44.01 g/mol), the 415 ppm concentration of $CO_2$ in the atmosphere corresponds to $1.13 \times 10^{-5}$ mol/L (M). Typically, approximately half of the $CO_2$ generated by combustion during for example, incineration, dissolves into oceans, where some of it can react to form carbonic acid. Most of the acid typically dissociates to bicarbonate ions, and some of that further dissociates to carbonate ion:

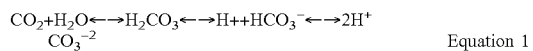

$$CO_2 + H_2O \leftrightarrow H_2CO_3 \leftrightarrow H^+ + HCO_3^- \leftrightarrow 2H^+ CO_3^{-2}$$

Equation 1

It is known to those skilled in the art that most of the carbon in the ocean (approximately 89%) is in the form of bicarbonate, $HCO_3^-$. Typically, the bicarbonate concentration is $2.38 \times 10^{-3}$ M, which is approximately 211 times the concentration of $CO_2$ in air. It is well known to those skilled in the art that it can be easier to remove a species from a mixture selectively if that species' concentration is higher.

Typically, the $H^+$ ions given off by carbonic acid are responsible for the acidification of the ocean, with its concomitant destruction of the bottom of the food chain as well as coral reefs. Selective removal of bicarbonate will therefore also mitigate the destruction being caused by ocean acidification.

As can be appreciated, the double arrows in Equation 1 indicates that all the reactions are reversible, (forward and backward reactions happening continuously in equilibrium). Typically, if one of the species in the mixture is selectively removed from the system, the reactions adjust according to Le Chatelier's Principle to reform and reestablish equilibrium. Therefore, selective removal of bicarbonate will result in more $CO_2$ moving from the atmosphere into the ocean to compensate, thus lowering atmospheric $CO_2$. The same effect will occur by partially evacuating a sample of seawater so that dissolved $CO_2$ bubbles out; the chemistry will adjust to restore dissolved $CO_2$ when the sample is pumped back into the sea.

According to a preferred embodiment of the present invention, the system and methods of restoring equilibrium can be speeded up by a catalyst. Typically the catalyst is an enzyme. More preferably, the catalytic enzyme is carbonic anhydrase (an enzyme used in many living things to maintain pH balance, by speeding up forward and reverse reactions). Typical applications for carbonic anhydrase have been used for the reverse of the present invention: to speed up conversion of $CO_2$ and water to bicarbonate and $H^+$ so that $CO_2$ may be captured from flue gas in for example, fossil fuel power plants before being emitted into the air.

Referring now to FIG. 1A a schematic diagram illustrating a system 100 to separate and remove carbon dioxide from seawater is provided according to an embodiment of the present invention. First, seawater 112 is pumped from the ocean into an extraction system, and solids are filtered out using standard method filters 114 employed in desalination plants, with slow enough flow rate known to those skilled in the art (for example, 0.1 m/s) that fish can swim back out, resulting in filtered seawater 116. Preferably, the system 100 is an extraction system and comprises a reactor, and a membrane.

In alternative embodiment of the present invention, the system can further include a catalyst. Preferably, the catalyst is a catalytic enzyme capable of boosting carbon-capture kinetics of bicarbonate. More preferably, the catalytic enzyme is carbonic anhydrase. Carbonic anhydrase is known to those skilled in the art to speed up the formation of bicarbonate by a factor of $10^7$.

Next, the filtered seawater 116 flows into the reactor chamber 118. Typically, the reactor chamber 118 can be any reactor chamber which is a tank known to those skilled in the art and FIG. 1A illustrates the simplest possible reactor chamber, although those in the art can appreciate that other embodiments of the present invention can use reactor chambers with multiple channels with higher surface area. Preferably, the higher the surface area, the greater the amount of $CO_2$ can be removed.

According to an embodiment of the present invention, typically, the reactor 118 can be a batch or continuous flow reactor. Preferably, the reactor 118 is a reactor chamber capable of holding liquid and capable of removing gases (for example, air) above the seawater by evacuation.

In yet a most preferred embodiment of the present invention, part of the reactor 118 contains a membrane 120. Typically, the membrane can be made of any membrane material known to those skilled in the art. Preferably, the membrane material allows some of the gases to be pumped out more easily than others. For example, silicone (polydimethylsiloxane) has a permeability coefficient that is much higher for $CO_2$ than it is for nitrogen, oxygen or argon; only water moves through silicone more efficiently. In yet an alternative embodiment of the present invention, the membrane is hydrophilic. In yet another alternative embodiment of the present invention, the membrane material can be selected from the group consisting of polyvinylidene difluoride, polyether sulfone, cellulose acetate, cellulose nitrate nylon, and glass microfiber.

Preferably, the membrane 120 is a membrane degasser, through which liquids such as water and gases can flow, but are impermeable to larger molecules like enzymes. Such membranes have pore sizes between about 4 and about 40 angstroms. According to an embodiment of the present invention, the pore size does not necessarily have to uniform and can be random.

According to an embodiment of the present invention, the reactor chamber 118 contains a solution 122 between a wall of the reactor chamber 118 and the membrane 120. In a most preferred embodiment of the present invention, the solution 122 contains the catalyst of the system 100 for more efficient and quicker re-establishment of equilibrium. According to an embodiment of the present invention the catalyst is a catalytic enzyme. More preferably, the catalytic enzyme can be any one of the various carbonic anhydrases found in animals and plants.

According to a yet preferred embodiment of the present invention, the filtered seawater 116 permeates freely back and forth across membrane 120 during its residence time in the reactor 118, rapidly establishing equilibrium between all species in Equation 1. Next, an air gap 124 above the filtered seawater 116 is partially evacuated by a vacuum pump through a port 126.

Typically, the gases pumped out of the seawater in the air gap 124 of the reactor 118 will be a mixture of the major atmospheric gases: water vapor, $CO_2$, nitrogen, oxygen and argon.

According to a most preferred embodiment of the present invention, when silicone is used as the membrane material, the gases pumped out of the seawater will most likely be completely water vapor and $CO_2$. These two gases can be easily separated, either by temperature or by adsorbents, so that once the water is stripped out, there should be no need for further gas separation before sequestration, although that always remains an option if desired.

According to yet another preferred embodiment of the present invention, carbon dioxide and water are pulled out through the port 126 and are separated at a cooler 128, where the water condenses and is then directed to an output of the reactor 130 which typically leads out to sea. Next, the remaining $CO_2$, preferably is pumped off to be compressed into cylinders ready for sequestration 132. In yet another preferred embodiment of the present invention a sequestration system that isolates the removed carbon dioxide to a location for at least one of storage and which can increase availability of renewable energy or non-fuel products (fertilizers and construction materials) and one or more energy sources that supply methods (heat) to the air extraction system to remove the carbon dioxide from the medium and which can regenerate it for continued used.

In yet another embodiment of the present invention, additionally, pumps can be utilized.

Figure 1B:
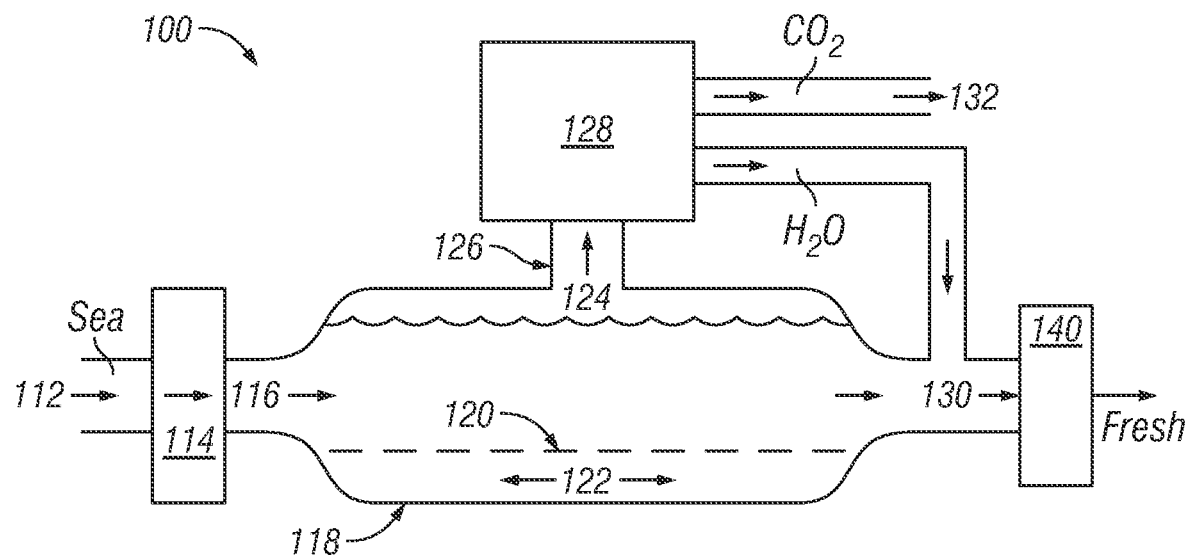
FIG. 1B illustrates a schematic system of separating and removing carbon dioxide from seawater combined with a desalination reactor; according to an embodiment of the present invention.
Figure 2:
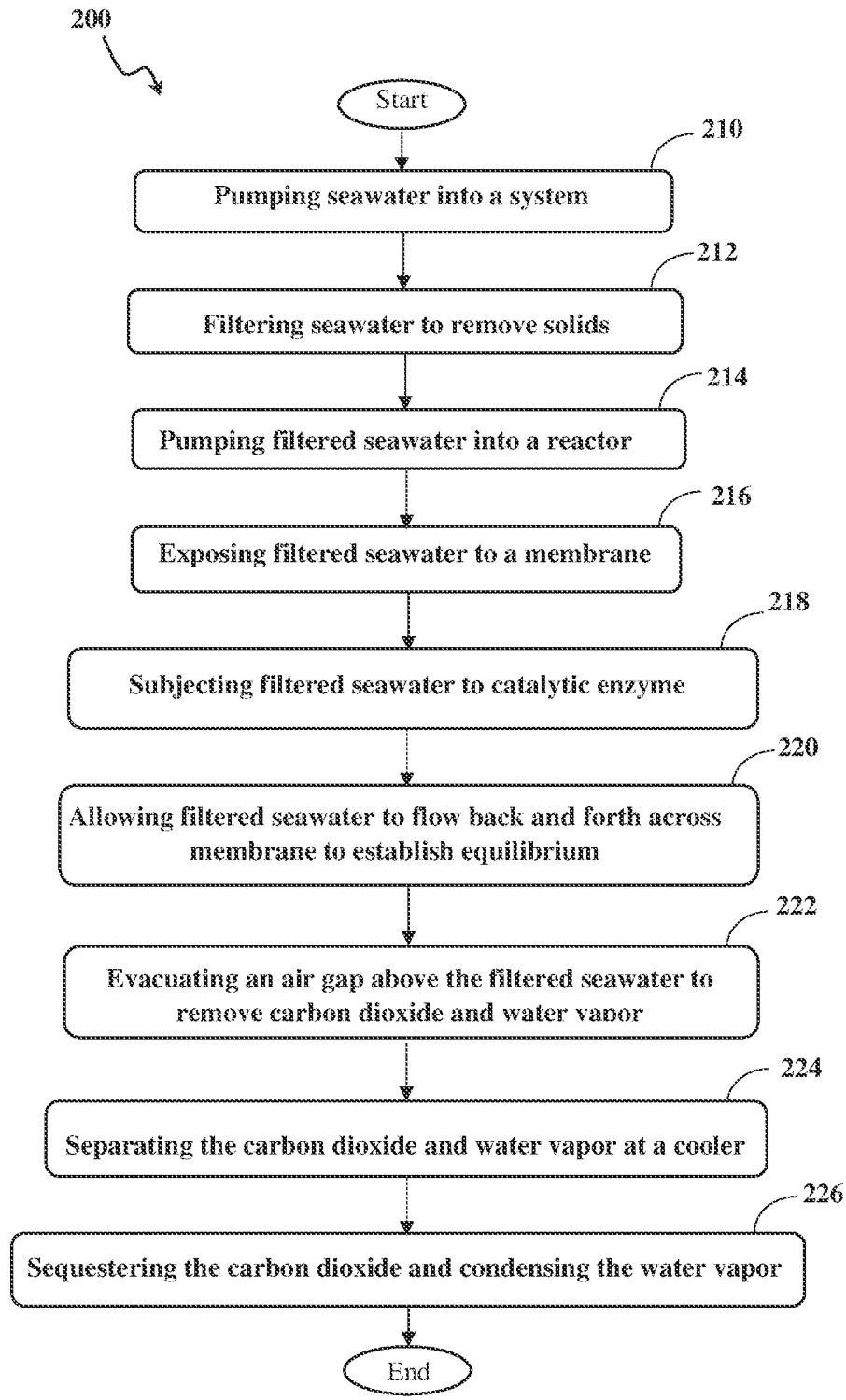
FIG. 2 illustrates a method of separating and removing carbon dioxide from seawater, according to an embodiment of the present invention.

Referring now to FIG. 2, in yet another preferred embodiment of the present invention, a method 200 for separating and removing carbon dioxide from seawater is provided. Preferably the method uses the extraction system described in FIGS. 1A and 1B. First, seawater from the ocean is pumped into a system 210 comprising a reactor; and a membrane. In an alternative preferred embodiment of the present invention, the system can further comprise a catalyst. Next, the seawater is filtered to remove solids 212 resulting in filtered seawater followed by pumping the filtered seawater into a reactor 214. Next, the filtered seawater is exposed to a membrane 216. In a most preferred alternative embodiment of the present invention, when the catalyst is present; subjecting the filtered seawater to the catalyst 218. The next step, allowing the filtered seawater to flow back and forth across the membrane to establish equilibrium 220 forming an air gap above the filtered seawater, the air gap comprising gases including carbon dioxide and water vapor. Next, evacuating the air gap above the filtered seawater to remove the carbon dioxide and water vapor 222. Next, separating the carbon dioxide and water vapor at a cooler 224. Finally, sequestering the carbon dioxide and condensing the water vapor 226. In an alternative embodiment of the present invention, the method further includes a step of desalinating the filtered seawater.

In still yet another embodiment of the present invention, the aforementioned system and methods can be scaled up and much more elaborate. For example, during membrane degassing, the surface area of the membrane interface can be greatly increased by use of multiple columns of the membrane polymer.

In yet another embodiment of the present invention, the utilization of temperature control can be used to maximize the rate of degassing. As water is heated, the solubility of carbon dioxide decreases, so that more gas bubbles out.

In still yet another embodiment of the present invention, methods for separation of the extracted carbon dioxide from the water vapor could be applied that would also be pumped out of the reactor.

Referring to the system and methods in FIGS. 1A, 1B & 2, according to embodiments of the present invention, the filtered seawater is subjected to a catalyst in the solution and the catalyst preferably is retained in the reactor by the membrane. Typically, according to an embodiment of the present invention, the low partial pressure causes dissolved $CO_2$ to bubble out of the water, where it can be captured for sequestration. According to an embodiment of the present invention, addition of carbonic anhydrase forces the equilibrium to shift, decreasing bicarbonate concentrate to generate more dissolved $CO_2$, which in turn is pumped out.

According to an embodiment of the present invention, the cycle continues while the seawater is in the reactor. When the water is returned into the ocean, the water preferably has been depleted of both $CO_2$ and bicarbonate, which causes it to absorb $CO_2$ from the atmosphere to restore the equilibrium.

According to yet another embodiment of the present invention, this method preferably requires an energy source. Preferably, the energy source is electrical. In order for the methods to create a net removal of $CO_2$ from the ocean, preferably the reactor's electric power comes from carbon-free sources to ensure that the $CO_2$ emitted during electrical power generation from the energy source is less than the amount of $CO_2$ removed according to the methods of the present invention. Preferable carbon-free energy sources can be nuclear, solar, wind or hydroelectric. According to an embodiment of the present invention, reactors employing the methods of removing $CO_2$ can be deployed to coastal areas that contract for clean energy or have their own dedicated solar panels.

In a still further alternative embodiment of the present invention as shown in FIG. 1B, there is a system that includes a desalination reactor 140 that includes the preferred previously described system to remove carbon dioxide from seawater, such that the desalination reactor 140 removes carbon dioxide and is capable of producing fresh water. The desalination reactor can be built in by combining to the preferred described system.

In summary, the present invention provides a system and method to remove carbon dioxide from seawater that is quick, efficient, not time consuming and inexpensive. Advantages of the system and methods according to preferred embodiments of the present invention over direct air capture methods since the preferred systems and methods disclosed utilizes the natural equilibrium already present in the environment. Typically, the concentration of carbon in seawater is much higher than in the air, and thus can be pulled out more efficiently. Natural equilibrium typically causes the ocean to absorb $CO_2$ from the atmosphere if it is removed from seawater. The advantages of these preferred embodiments of the systems and methods of the present invention takes advantage of the already natural equilibrium occurring, over for example, electrochemical methods, since the methods and systems disclosed do not require energy to drive the chemical reaction. The methods and systems disclosed simply utilizes the natural equilibrium, accelerated by a natural catalyst, to separate the desired component, in this case carbon dioxide.

Throughout the description and drawings, example embodiments are given with reference to specific configurations. It can be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A method of separating and removing carbon dioxide from seawater in an extraction system comprising: a reactor; and a membrane, the method comprising the steps of:
   a) pumping seawater into the extraction system forming filtered seawater;
   b) filtering the seawater to remove solids;
   c) pumping the filtered seawater into the reactor;
   d) exposing the filtered seawater to the membrane;
   e) allowing the filtered seawater to flow back and forth across the membrane until equilibrium is established, whereby carbon dioxide and water vapor form in an air gap;
   f) evacuating the air gap above the filtered seawater to remove the carbon dioxide and water vapor;
   g) separating the carbon dioxide and water vapor in a cooler; and
   h) sequestering the carbon dioxide.

2. The method according to claim 1, further comprising the step of subjecting the filtered seawater to a catalytic enzyme after the step of exposing the filtered seawater to the membrane.

3. The method according to claim 2, wherein the catalytic enzyme is carbonic anhydrase.

4. The method according to claim 1, wherein the membrane comprises a membrane material having pores with sizes from about 4 angstroms to about 40 angstroms.

5. The method according to claim 4, wherein the membrane material comprises silicone.

6. The method according to claim 5, wherein the membrane material is polydimethylsiloxane.

7. A method of separating and removing carbon dioxide from seawater in an extraction system, the method comprising the steps of:
   a) pumping seawater into the extraction system forming filtered seawater;
      wherein the extraction system comprises a reactor, a membrane having pores with sizes from about 4 angstroms to about 40 angstroms and a catalytic enzyme;
   b) filtering the seawater to remove solids;
   c) pumping the filtered seawater into the reactor;
   d) exposing the filtered seawater to the membrane;
   e) subjecting the filtered seawater to the catalytic enzyme;
   f) allowing the filtered seawater to flow back and forth across the membrane until equilibrium is established, whereby carbon dioxide and water vapor form in an air gap;
   g) evacuating the air gap above the filtered seawater to remove the carbon dioxide and water vapor;
   h) separating the carbon dioxide and water vapor in a cooler; and,
   i) sequestering the carbon dioxide.

8. The method according to claim 7, wherein the catalytic enzyme is carbonic anhydrase.

9. The method according to claim 7, wherein the membrane comprises silicone.

10. The method according to claim 7, wherein the membrane comprises polydimethylsiloxane.

11. The method according to claim 7, further comprising a step of desalinating the filtered seawater.

12. The method according to claim 1, wherein the membrane comprises a membrane material permeable to carbon dioxide and water.

13. The method according to claim 1, wherein the membrane material comprises silicone.

14. The method according to claim 2, wherein the catalytic enzyme converts bicarbonate ion into dissolved carbon dioxide.

15. The method according to claim 7, wherein the catalytic enzyme converts bicarbonate ion into dissolved carbon dioxide.

* * * * *